United States Patent
MacKinnon et al.

(10) Patent No.: US 6,366,373 B1
(45) Date of Patent: Apr. 2, 2002

(54) METHOD OF INTRINSIC CONTINUOUS MANAGEMENT DATA TRANSMISSION IN FIBER OPTIC COMMUNICATIONS

(75) Inventors: Neil MacKinnon, San Jose; Lee Joseph Zipin, Menlo Park, both of CA (US)

(73) Assignee: LuxN, Inc., Sunnyvale, CA (US)

(*) Notice: Subject to any disclaimer, the term of this patent is extended or adjusted under 35 U.S.C. 154(b) by 0 days.

(21) Appl. No.: 09/449,043

(22) Filed: Nov. 24, 1999

(51) Int. Cl.[7] ............................................ H04B 10/12
(52) U.S. Cl. ....................... 359/110; 359/117; 359/128
(58) Field of Search ................................. 359/117, 181, 359/118, 124, 115, 110, 162, 177, 182, 184, 128; 370/527, 529, 486

(56) References Cited

U.S. PATENT DOCUMENTS

| | | | |
|---|---|---|---|
| 5,416,626 A | 5/1995 | Taylor | 359/156 |
| 5,438,444 A | 8/1995 | Tayonaka et al. | 359/123 |
| 5,712,932 A | 1/1998 | Alexander et al. | 385/24 |
| 5,920,412 A | 7/1999 | Chang | 359/128 |
| 5,936,754 A * | 8/1999 | Ariyavisitakul et al. | 359/145 |
| 5,956,165 A * | 9/1999 | Fee et al. | 359/118 |
| 5,959,749 A | 9/1999 | Danagher et al. | 359/124 |
| RE36,715 E * | 5/2000 | Taylor | 359/156 |
| 6,101,012 A * | 8/2000 | Danagher et al. | 359/127 |
| 6,108,113 A * | 8/2000 | Fee | 359/124 |
| 6,154,484 A * | 11/2000 | Lee et al. | 375/130 |

OTHER PUBLICATIONS

Clark, Martin P.: "The Technique of Cell Relay," ATM Networks Principles and Use, published by Wiley Teubner Communications, p. 13.

Gaudino, R., et al.; "Remote Provisioning of a Reconfigurable WDM Multichannel Add/Drop Multiplexer," IEEE Photonics Technology Letters, vol. II, No. 8, Aug. 1999, pp. 1060–1062.

\* cited by examiner

*Primary Examiner*—Leslie Pascal
(74) *Attorney, Agent, or Firm*—David H. Jaffer; Pillsbury Winthrop LLP (57) ABSTRACT

A method allowing reliable routing of individual optical carriers through an optical network is disclosed. Routing information is impressed on individual carriers by a method known as subband quadrature coding (SQC). The optical carrier is modulated at a first frequency, and at a first intensity to impress application data on the carrier. The carrier is additionally modulated at a second frequency, preferably two orders of magnitude less than the first frequency, and at a second intensity less than the first intensity to impress management data on the carrier for routing the carrier through an optical communications network, from a source to a destination. According to the method, the management data is continuously impressed upon the carrier during transmission of the application data. The optical carrier is multiplexed onto the fiber optic communications line, and upon reaching a first node, the carrier is demultiplexed and an intensity sample of the carrier is detected. The management data is then separated out with a low pass filter, whereupon in response the method directs the carrier signal according to the management data.

12 Claims, 5 Drawing Sheets

METHOD OF INTRINSIC CONTINUOUS MANAGEMENT DATA TRANSMISSION IN FIBER OPTIC COMMUNICATIONS

BACKGROUND OF THE INVENTION

1. Field of the Invention

The present invention relates generally to methods of routing carrier wavelengths through a fiber optic communications network, and more particularly to a method wherein management data is continuously transmitted by subband quadrature coding along with application data on an optical wavelength carrier signal for routing a carrier wavelength through an optical communications network.

2. Brief Description of the Prior Art

Figure 1:
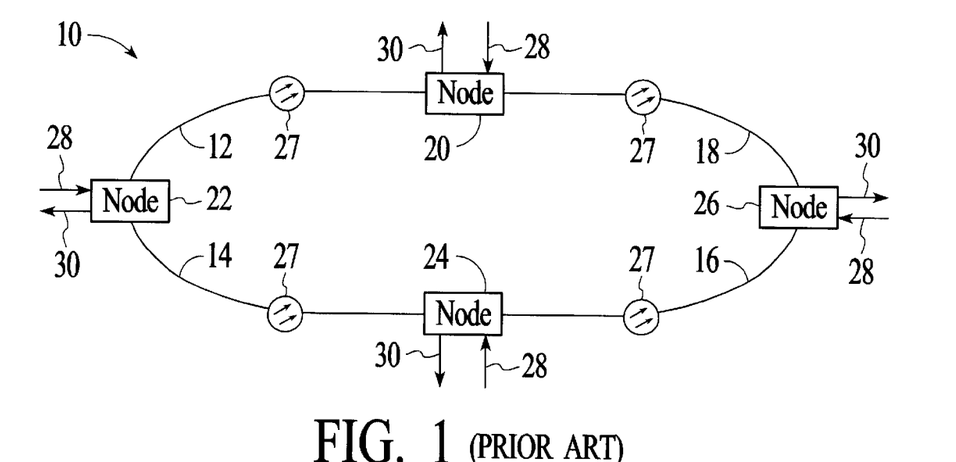
FIG. 1 illustrates a prior art network.

Optical communications systems service an important and expanding portion of current needs. The wide bandwidth provided by lightwave carrier signals allows the transmission of larger quantities of data to be sent in a given time frame than in systems using carriers at lower frequencies. Reliable and economical methods are required for directing/routing the optical signals from a source to a desired destination. FIG. 1 is a simplified diagram of a network 10 for illustrating an example of the routing of signals through a network. Fiber optic cables 12–18 interconnect four nodes or hubs 20–26 providing access to the network 10. A symbol such as item 27 is used to indicate that a line is a fiber optic cable, and will be used for that purpose in the various figures of the drawing. Each node in FIG. 1 includes circuitry for inputting data at 28 and outputting data at 30, the circuitry having a laser source, a controller, and an add/drop module for receiving/dropping and sending/adding a signal from and to the network 10.

Figure 2:
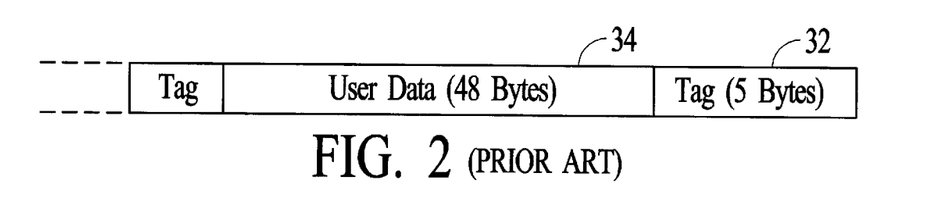
FIG. 2 illustrates the use of a "tag" or "header" for directing data flow in a network.
Figure 3:
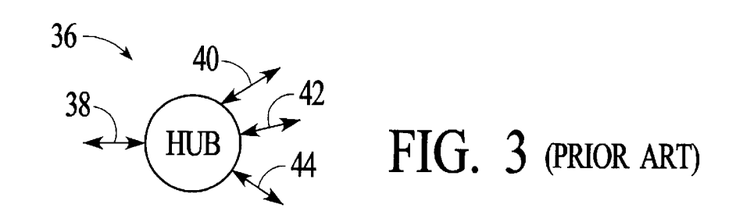
FIG. 3 illustrates a "hub" in a network for routing signals.

The signals transmitted include user application data, and must also contain or be accompanied by a signal with management data identifying the required destination. Each node must have the capability of reading the management data and receiving data that is intended for that node. One prior art method of transmitting management data is illustrated in FIG. 2 wherein a block of management data, noted as a tag 32, is transmitted to identify a required destination. Each node reads the management data, and responds by receiving user data 34 intended for that destination, and causes user data for other destinations to continue around the network 10. A signal is simply transmitted around the ring until it reaches the required destination. Another type of network element is illustrated in FIG. 3 wherein a hub or router 36 evaluates management data, for example from an incoming signal on line 38, and responds by transmitting the signal on the appropriate one of lines 40, 42 or 44.

A disadvantage of the use of a tag 32 or header is that, because it occupies only a finite time frame, it can be lost or misread as a result of system noise. Use of a "header" is described for example in U.S. Pat. No. 5,438,444 by Tayonaka (column 3, lines 20–43; and column 10, lines 26–34). The technique of using a header to determine a destination is also described in *ATM Networks, Principles and Use*, by Martin P. Clark, page 13 (a Wiley Teubner publication). Another disadvantage of using a "tag" or header to carry management data is that it consumes system bandwidth that could otherwise be used for application data. For example, in ATM cells, a cell length is 53 bytes of which 5 are used for a tag to carry management data, as illustrated in FIG. 2.

Figure 4:
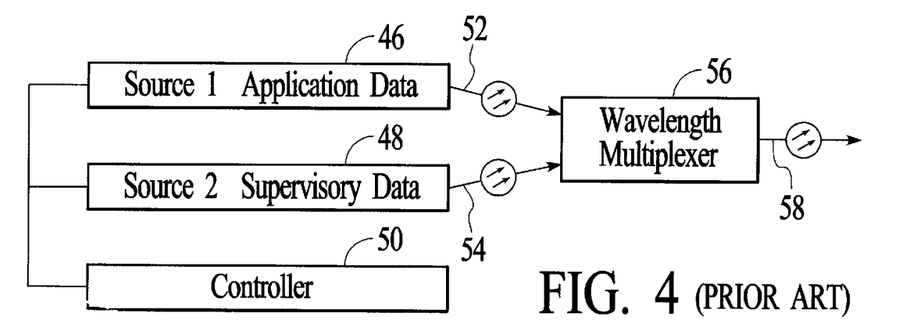
FIG. 4 is a block diagram showing use of a separate laser source/wavelength to transmit management data.

Another method that is used to transmit management data is illustrated in FIG. 4. Two laser sources 46 and 48 at different wavelengths are used. Source 1 carries the application data, and source 2 carries the management data. The data input/modulation of the two sources is managed by a controller 50. The two source outputs at 52 and 54 are fed through a multiplexer 56 to place them on a single optic fiber 58. The disadvantage of this method is the cost and complexity of the additional management channel.

SUMMARY

It is therefore an object of the present invention to provide an improved method of transmitting network management data through an optical communications network.

It is another object of the present invention to provide a low cost and reliable method of transmitting management data in an optical communications network.

Briefly, a preferred embodiment of the present invention includes a method of transmitting network management data through an optical communications network for routing of discrete wavelengths through the network by controlling switching at the nodes, wherein the management data is impressed on an optical carrier of a particular wavelength through use of a method known as subband quadrature coding (SQC). The optical carrier is modulated at a first frequency, and at a first intensity to impress application data on the carrier. The carrier is additionally modulated at a second frequency, preferably two orders of magnitude less than the first frequency, and at a second intensity less than the first intensity to impress management data on the carrier for routing the carrier through an optical communications network, from a source to a destination. According to the method, the management data is continuously impressed upon the carrier during transmission of the application data. The optical carrier is multiplexed onto the fiber optic communications line, and upon reaching a first node, the carrier is demultiplexed and an intensity sample of the carrier is detected. The management data is then separated out with a low pass filter, whereupon in response the method directs the carrier signal according to the management data.

DETAILED DESCRIPTION OF THE PREFERRED EMBODIMENT

Figure 5:
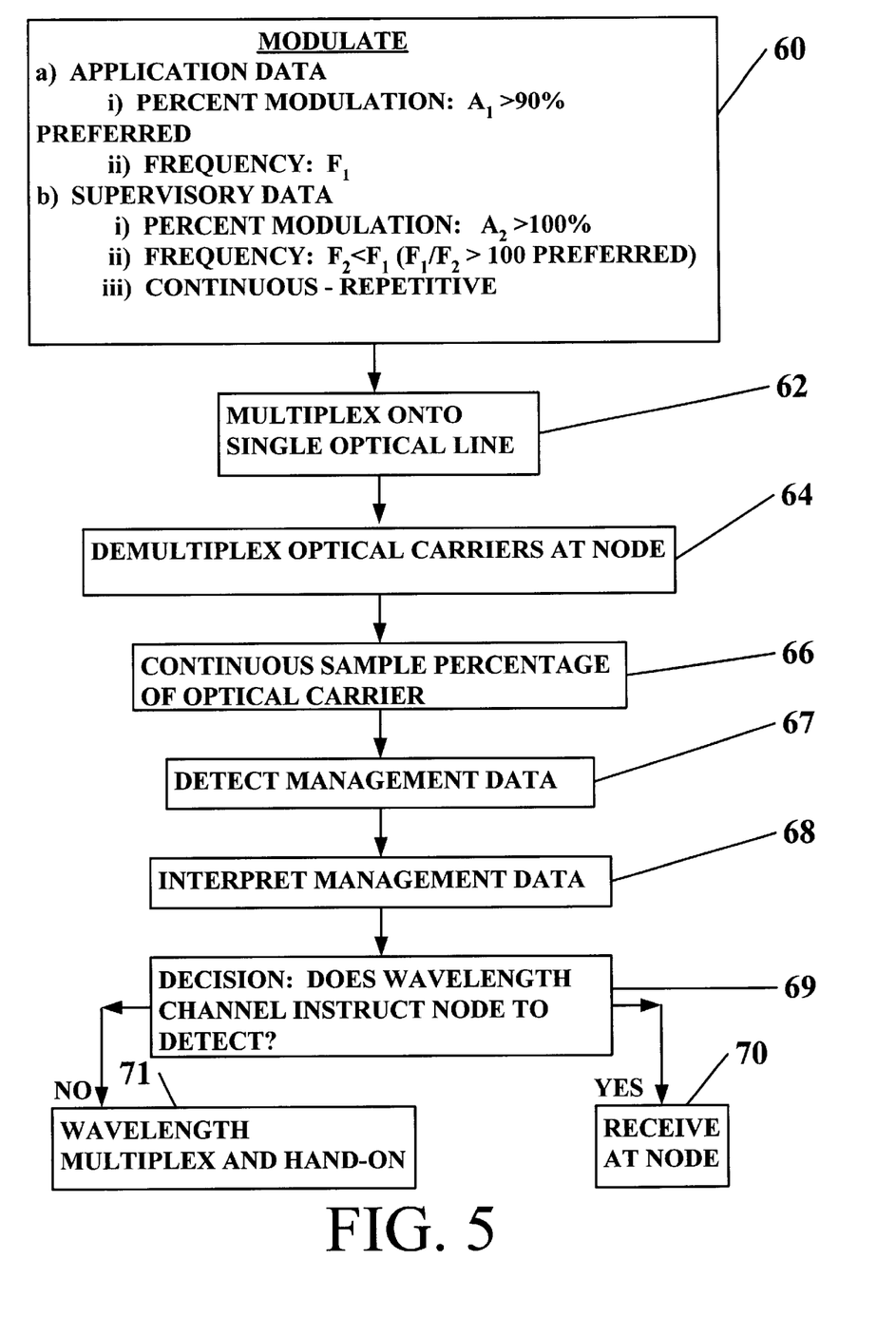
FIG. 5 is a flow chart according to the present invention.

The preferred embodiment of the present invention will now be described in reference to the flow chart of FIG. 5.

The present invention provides a method and apparatus for routing a carrier wavelength through an optical communications network. An optical carrier is generated as a carrier of application and network management data that are impressed upon the carrier by modulation, the management data being for the purpose of routing a discrete carrier wavelength through an optical communications network. The type of modulation to be described is a form known as subband quadrature coding (SQC). The management data includes that information necessary to route the carrier through a communications network from a source to a destination, i.e. to manage the network as an entity, to alter its properties including dynamically configuring/reconfiguring the network routing. Although other data may also be transmitted, including network supervisory data, the present invention focuses on a method of transmitting management data. Supervisory data is distinctly different. It is a reporting function having to do with the "health" of the network, and includes data necessary to detect network problems, such as a broken fiber optic cable, equipment degradation such as a malfunctioning node, and detecting alarms giving notice for example of degraded transmission quality. Supervisory data does not include routing information. Block 60 summarizes the modulation method according to the present invention. The carrier is modulated for transmission of application data at a high frequency, termed a subband. A high percentage of carrier modulation is used, with >90% modulation preferred. The management data in effect uses the application data as a carrier, the data being impressed on the carrier by modulation at a much lower frequency than the application data and at an amplitude less than 100%. The lower frequency is preferably two orders of magnitude less than the frequency of modulation used for application data. The reason for the lower frequency and lower amplitude is to facilitate separation of the application data from the management data at the desired destination. A novel feature of the present invention provides for a continuous and therefore repetitious transmission of management data along with the application data.

The modulated carrier beam is then placed (block 62) on an optic communications line/ fiber, with other optical carriers of other wavelengths through use of a wavelength multiplexer. When the carrier arrives at a node, the management data must be evaluated in order for the node to determine if the carrier is for reception at the current node, or if it should be allowed to continue on through the network. The first step in this process is to separate a selected carrier wavelength from other carrier wavelengths that may also be in transit through the network. This process is generally known as wavelength demultiplexing, as indicated in block 64. According to the present invention, a sampling, i.e. a small percentage of the selected optical carrier is then continuously extracted/coupled off (block 66) for the purpose of continuously monitoring the continuous and repetitious transmission of management data according to the present invention. The management data is then detected (block 67), and interpreted (block 68). According to the method, the system then checks the management data to determine if the data is intended for the present node (block 69). If the answer is "yes," the carrier is received (block 70). If the answer is "no," the carrier is wavelength multiplexed back onto the single optic communications line with other carrier wavelengths (block 71) and thereby allowed to continue on through the network.

Figure 6:
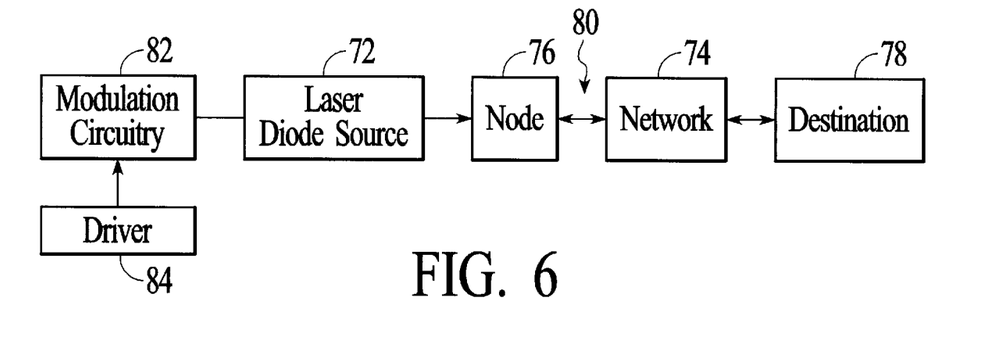
FIG. 6 is a block diagram for describing the modulation according to the present invention.
Figure 7:
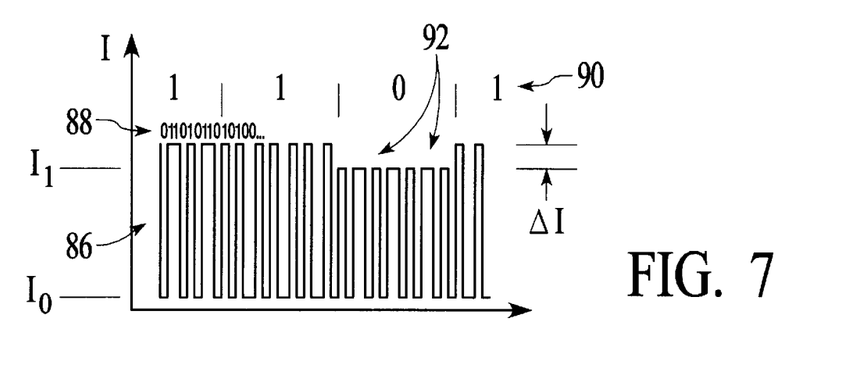
FIG. 7 is a graph for illustrating the impression of digital application and supervisory data on an optical carrier.

Further details of the preferred embodiment will now be fully described in reference to the various figures of the drawing. FIG. 6 shows a laser diode source 72 connected to an optical network 74 through a node module 76 for sending both application data and supervisory data through the network 74 and to a destination 78. The laser diode output at 80 is proportional to the laser diode current. Referring to FIG. 7, the information to be transmitted in the form of digital data is sent by modulating the diode current "I", which in turn modulates the laser output power level to represent the digital data 1's and 0's. A higher power is generally used to represent a digital "1", and a lower level to represent a digital "0". The laser diode current (I) is controlled by modulation circuitry 82 driven by a microcontroller/driver 84.

The driver 84 and modulator 82 function to control the diode current (I) in the manner shown in FIG. 7. The current I is modulated from a minimum value $I_0$ to a maximum of $I_1+\Delta I$. The higher frequency modulation carrier 86 represents the application data 88. The supervisory data 90 uses the application data modulated signal 86 as a subcarrier, and is shown in FIG. 7 as variations, such as at 92, in the peak amplitude $I_1+\Delta I$ of the application data signal of an amount $\Delta I$. A digital zero for supervisory data is therefore represented as a peak current level $I_1$ in the application data signal, and a digital "1" is a current level $I_1+\Delta I$ in the application data signal. The application data is a digital "0" for a current of $I_0$, and a digital "1" for a current $\geq I_1$.

Figure 8:
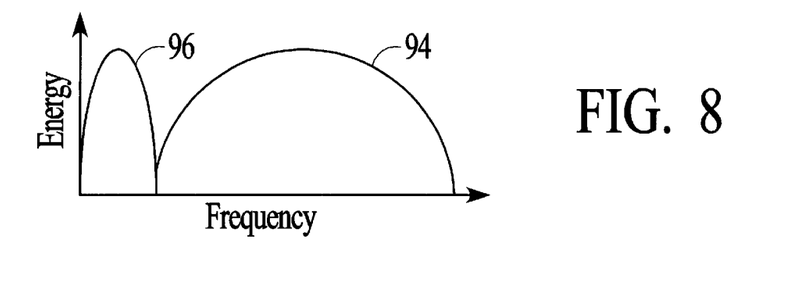
FIG. 8 shows the separate bands of frequencies used for application data modulation and for supervisory data modulation.

The method as described above requires that the modulation rate, i.e., the rate of occurrence of high current levels ($I_1$ or $I_1+\Delta I$) followed by a low current level $I_0$, from a digital 0 to a digital 1, be at a rapid enough rate relative to the management data rate, so that the data error rate is acceptable. For example, the application data rate could decrease to an unacceptable level if the application data includes a long sequence of "0's. During that time period the application data could not serve as a carrier for the management data. It is therefore required according to the present invention that the application data be configured to maintain an adequate rate of occurrence of changes from 0's to 1's to provide definition to the management data. The preferred embodiment of the present invention provides that the average application data rate be a minimum of two orders of magnitude more than the data rate of the management data. In addition, the application data is required to be run-length limited, i.e., a limit is imposed on the length of consecutive 0's to assure an acceptable number of bit transactions in a given period of time. Preferably, any set of five contiguous bits should contain at least a single "1" bit. With the application data rate two orders of magnitude greater than the management data, and at least a "1" in every series of 5 bits, the management data error rate is negligible. Other ranges of value are also included in the spirit of the present invention. FIG. 8 illustrates the desired "non-interfering" frequency spectrum of application data 94 and the lower frequency management data 96, wherein the management data occupies the frequency spectrum below the application data.

The above description of the present invention uses amplitude modulation as an example, and as the preferred embodiment. Other types of modulation are also included in the present invention and will be understood by those skilled in the art after reading the description contained herein. Examples of some of these will be discussed in the following text.

Figure 9:
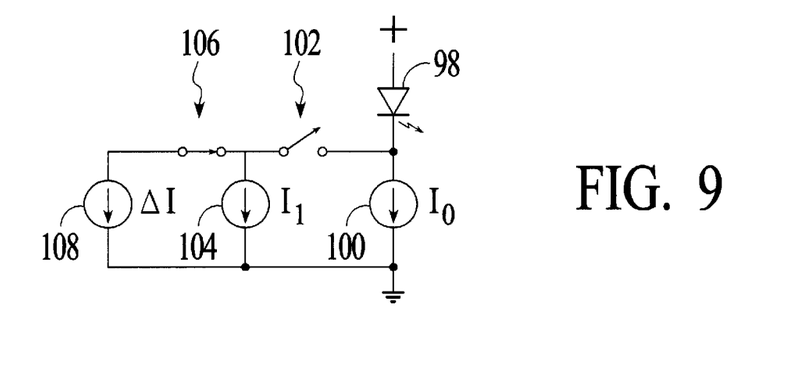
FIG. 9 is a simplified schematic diagram for use in describing the modulation method of the present invention.

Referring again to the use of amplitude modulation, FIG. 9 is a simplified circuit diagram illustrating a method of modulating the current of a laser diode for simultaneously transmitting both application data and management data. FIG. 9 shows three current control devices/circuits arranged in parallel. The group of control devices are in series with a laser diode 98. A first current control device 100 sets a minimum current at the value $I_0$. A first switch 102 connects a second current control 104 in parallel with control 100, and a second switch 106 connects the third device 108. Switch 102 is responsible for switching at the higher application data rate. The second switch 106 is controlled for applying the lower rate management data. When both switches 102 and 106 are closed, the total current is $I_1+\Delta I$ as illustrated in FIG. 7. Opening switch 106 causes a reduction in the maximum current level by $\Delta I$, resulting in a management data "0", and closing switch 106 is a management data "I". Opening switch 102 is an application data bit "0", and closing switch 102 is an application bit "1". When the switch 102 is open, only the application data digital "0" level with current $I_0$ flows through the laser diode 98.

A system designer can set the values of the currents $I_0$, $I_1$, and $\Delta I$ to control channel characteristics. A smaller $\Delta I/I_1$ ratio has less impact on the application data bit error rate and jitter, but increases the management data bit error due to the lower amplitude of the demodulated management signal. A higher $\Delta I/I_1$ ratio provides a stronger, more robust management signal at the expense of the application data signal quality. The channel microcontroller sets the various laser currents and adjusts them dynamically to optimize channel transmission characteristics.

Figure 10:
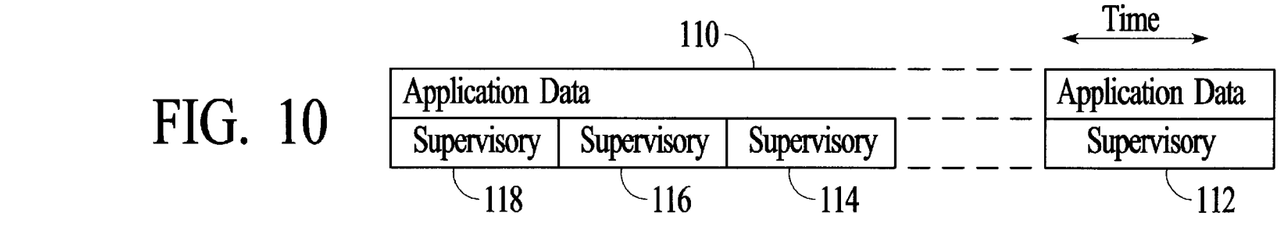
FIG. 10 is a diagram for illustrating the continuous, repetitious transmission of supervisory data along with application data.

In addition to the modulation described above, according to the present invention, the management data is continuously and repetitiously transmitted along with the application data. This is illustrated in FIG. 10 wherein application data 110 is accompanied by management data blocks/streams 112–118. Normally, data streams 112–118 are all identical, indicating that the destination and route has not changed. However, in the event that it is desirable to change the destination or routing, this can be done in a management data block to be transmitted. The continuous transmission of management data is an improvement over the prior art use of a header placed in series with application data. For example, a block of noise could alter the management data and cause the beam to be redirected. If this happens with a header, the application data is lost. If such an event occurs with the present invention, the management data block following the one disturbed can correct the direction of the beam. As mentioned above, it is also possible with the present invention to include altered management data in a management data block to redirect the beam.

Figure 11:
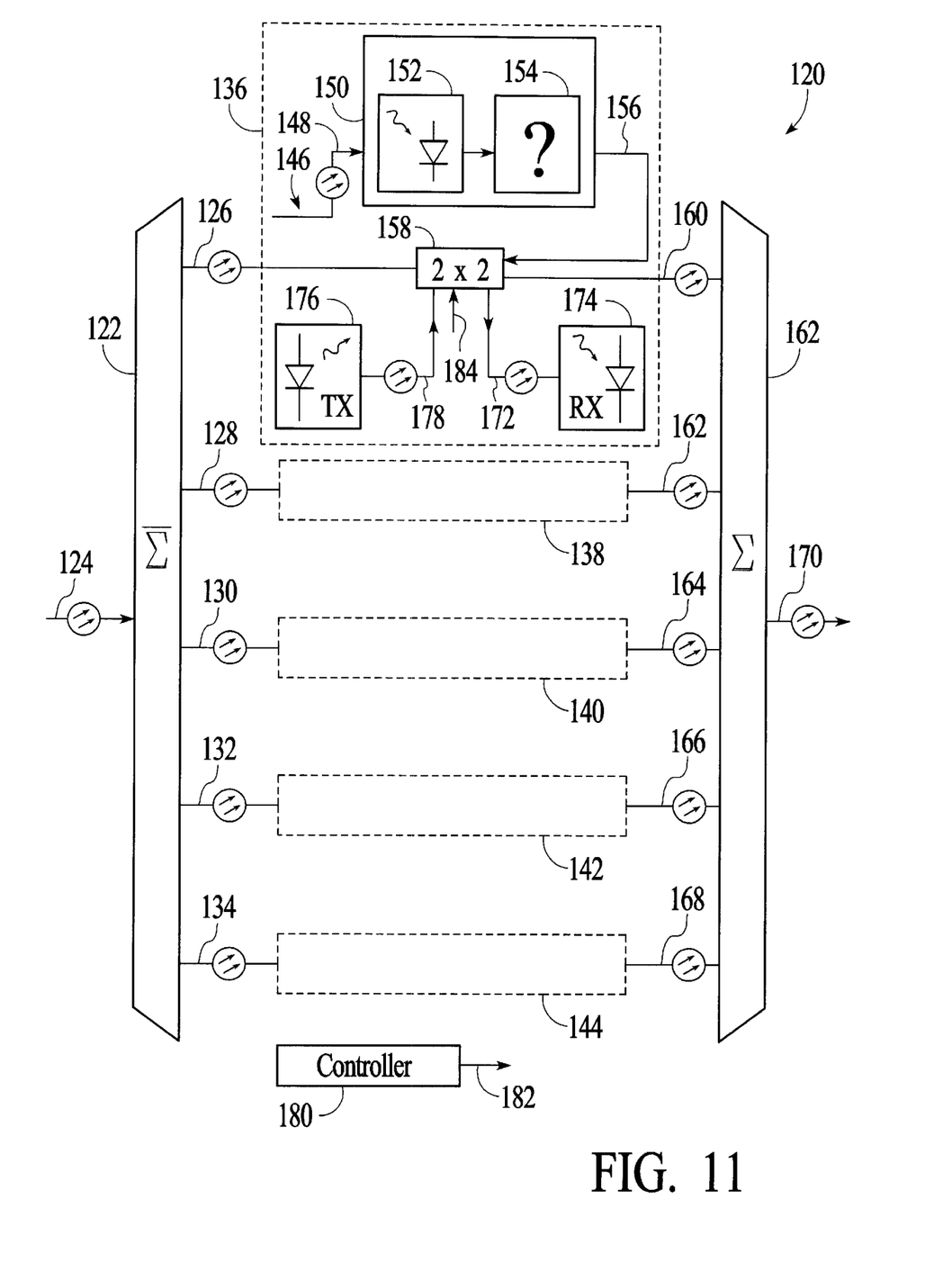
FIG. 11 is a block diagram of an example node circuit.

Referring momentarily back to FIG. 1, a communications network includes nodes, such as items 24–32, for receiving and transmitting data, and for directing/redirecting an incoming optical carrier. A network can also include a hub for redirecting optical carriers. A preferred embodiment of a node circuit to perform the functions according to the present invention is shown in FIG. 11. The circuit is shown in block diagram form. The details of circuitry for accomplishing the functions described will be readily accomplished by those skilled in the art after reading the present disclosure. The node 120 of FIG. 11 includes a wavelength demultiplexer 122 that receives one or more optical carriers from optical fiber line 124, and outputs each carrier wavelength on a separate line, such as lines 126–134. Although five lines are shown, the present invention includes any number of lines. Each of the lines 126–134 is connected to a node-processing circuitry such as 136. The circuitry 138–142 for lines 128–134 are similar to circuit 136 and for simplicity are shown as dashed-lined boxes.

Circuitry 136 includes a carrier sampling device 146, such as a coupler, for directing a small portion of the carrier signal strength on line 126 to line 148 for input to a management data recovery circuit 150. Circuit 150 performs the function of extracting and evaluating the management data from the incoming optical carrier. Since the management data is imposed on the carrier as a relatively low frequency modulation, the circuitry included in 150 for that purpose is relatively inexpensive. The detection operation is indicated by block 152. Block 154 is a decision circuit for evaluating the management data and determining if the carrier on line 126 is supposed to be received by node 120, and if it is not, an output is sent on electrical line 156 to cause the optical switch 158 to pass the carrier on (hand-on) to optical line 160. A multiplexer 162 accepts the carriers on lines 160–168 and outputs them on a single fiber optical line 170. If the decision circuit 154 determines that the carrier on line 126 is supposed to be received by node 120, a signal is sent on line 156 to cause the switch 158 to direct the optical carrier on line 126 to line 172, whereupon it is processed by a receiver 174 which includes circuitry for separating out the application data. Each of circuits 136–144 also may optionally include the capability of transmitting an optical carrier, originating at node 120. This is indicated by block 176 representing a transmitter for outputting a modulated optical carrier on optic line 178 to the 2×2 optical switch 158. A controller 180 provides an output 182 to an input 184 to switch 158 to cause the carrier on line 178 to be passed on to line 160. The carrier is then placed on line 170 by multiplexer 162.

Figure 12:
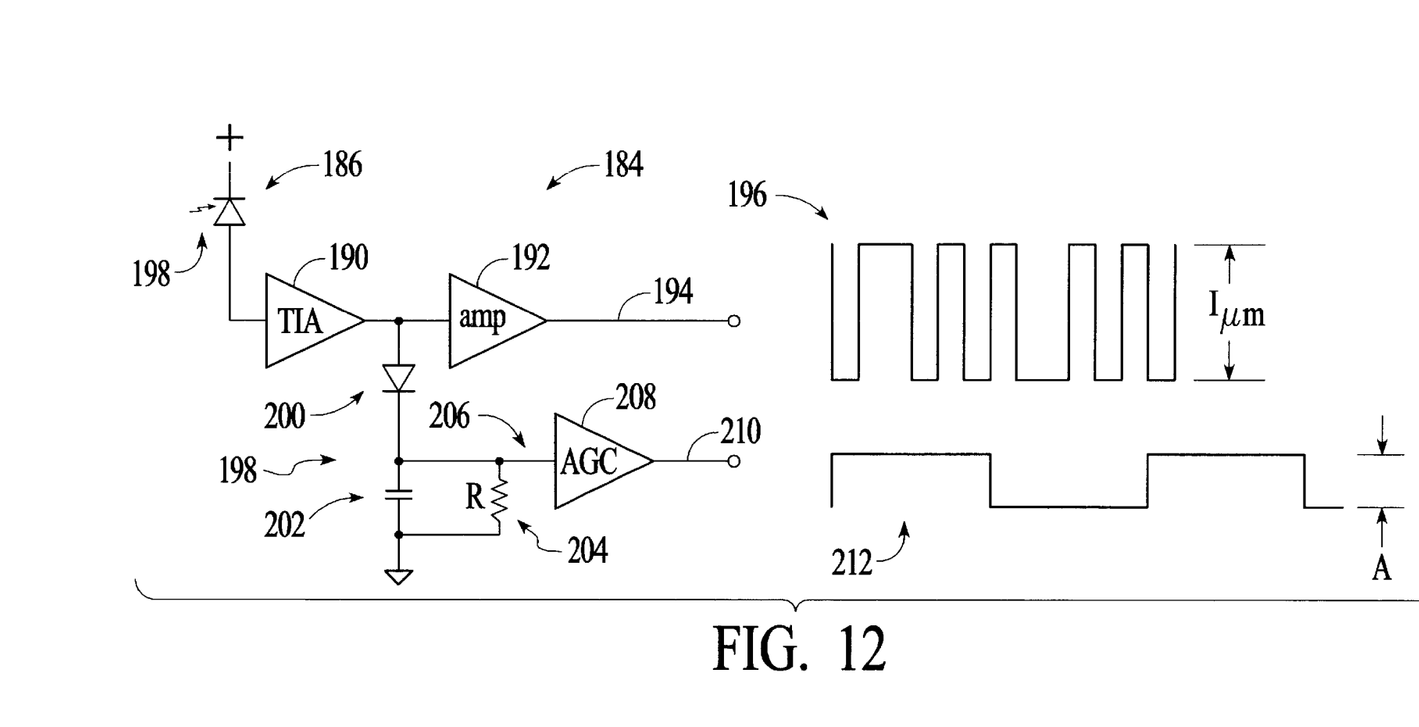
FIG. 12 is a circuit diagram of an electrical demultiplexer for separating out management data and application data from a modulated optical carrier.

The system of the present invention involving modulators requires a method and apparatus for demodulating the signal at the receiver/node. For example, as described above, the circuit 150 of FIG. 11 must perform demodulation to extract the management data, and the receiver 174 must demodulate the carrier to remove the application/user data. A circuit 184 for detecting an optical carrier and performing the required demodulation is shown in FIG. 12. The circuit as shown separates out both the management data and application data. The portions of circuitry for each function, however, can be separately used as required, for example if the circuits 150 and 174 are remote from each other. Such details will be well understood by those skilled in the art, and will not be further addressed. The circuit 184 uses a PIN diode 186 to convert the modulated incoming laser energy 188 of a selected wavelength to an electrical current . The current from the PIN diode 186 is converted by a transimpedance amplifier (TIA) 190 to a voltage signal. This voltage signal drives a limiting amplifier 192 which has an output 194 providing an application data output signal 196, limited in voltage output to a level $I_{lim}$. In other words, the amplifier 192 removes the management data from the signal, leaving only the application data at output 194. The voltage signal output of the transimpedance amplifier 190 also drives an amplitude modulation (AM) detector 198 consisting of diode 200 and a low pass filter including capacitor 202 and resistor 204. The detector 198 output at 206 feeds an automatic gain control (AGC) amplifier 208 having an output 210 providing a management data signal 212 of amplitude "A". The operation of the demodulator, also known as a peak detector, will now be described in further detail.

Diode 200 charges capacitor 202 to the peak voltage of the signal output from the TIA 190. In between these peaks, resistor 204 drains the charge from capacitor 202, allowing its voltage to drop toward zero. The values of resistor 204 and capacitor 202 create a time constant, and are chosen so that the charge in capacitor 202 drops little between application data "1"s (which are the peaks of the signal provided by the TIA 190), but falls when the peaks assume a lower value representing the management data "0". Thus, the voltage across capacitor 202 tends to follow the management data levels. The AGC amp 208 corrects for management data level variations due to varying optical signal strength. Meanwhile, the limiting amp 192 removes amplitude variations in the signal delivered by the TIA 190, so that all application data "1"s are the same level. The output of the limiting amp 192 is the recovered application data; this signal does not contain management data.

The circuit of FIG. 12 is given as an example. Various details are not shown, which will be apparent to those skilled in the art, such as bias circuitry of the PIN diode and amplifier. Other variations of this circuitry will be apparent to those skilled in the art, and these variations are also to be included in the spirit of the present invention. In many such circuits, the PIN diode bias current is provided via a bias resistor and a fixed supply voltage. The PIN diode 186 provides detection of the optical signal by drawing more or less total current according to the strength of the optical signal. The bias resistor voltage also follows the input signal. This behavior is similar to that of diode 200 and resistor 204 in FIG. 12. With the addition of a suitable capacitor, the PIN diode circuit just explained may inherently provide management signal demodulation, without requiring a separate peak detector 198.

Other AM-based methods may provide improved channel data and/or management data signals at the expense of system complexity. These variations on basic amplitude modulation (AM) will now be briefly described in order of increasing complexity:

Balanced AM. In this method the management data changes both the "0" and "1" laser current levels, such that an application data "0" is generated with more current during a management data "0" than during a management data "1"; and an application data "1" is generated with more current during a management data "1" than during a management data "0". The example described in FIG. 7 shows this behavior for an application "1", but an application "0" is unaffected by the management data. The balanced technique seeks to maintain an average optical power level that does not change with management data.

Controlled slope AM. In this approach, the laser current values change according to the management data, but do not change as a step function (i.e., one application data "1" is driven by a certain value of laser current, and an adjacent data "1" is driven by a different current). Instead, the slope of the management data bit edges is made slower, resulting in a more gradual transition from one current level to another. This allows the optical receiver circuitry to better recover the application data, resulting in a better bit-error rate.

AGC based detector. This approach uses a TIA with an automatic gain control (AGC) circuit, allowing the receiver to reduce the amplitude variations of the management data as a function of received optical power. An AGC circuit changes the amplification factor of the associated block such that a weaker signal is boosted more than a stronger one. Since AM based management data appears as a variation in signal strength, an AGC circuit would tend to cancel that variation. The control voltage developed by AGC which, in turn, controls the amplification level, varies with management data. Therefore, this voltage effectively reproduces the management data.

Synchronous detection. In a Synchronous detection method, the receiver recovers the channel data, which is carrying the management data. The form of AM demodulation known as synchronous (or coherent) detection uses the carrier (the channel data) to switch the received signal at the channel data rate, canceling the carrier and recovering the management data. Synchronous detectors may allow a lower modulation level and still provide the target management data signal/noise ratio.

Quadrature Amplitude Modulation (QAM). This is a popular multi-level AM method that encodes multiple data bits into a single carrier variation (baud). Implementing a version of QAM requires that a subcarrier be encoded with the management data bits, and the encoded subcarrier modulate the high speed data stream. A management data implementation using QAM requires considerable complexity, but may provide better high speed data error rates.

In addition to the above disclosed methods of amplitude modulation, the spirit of the present invention involving the use of an application data stream as a subcarrier for management data can also be implemented with other modulation methods and these are to be included in the spirit of the present invention.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of optical communications comprising:
   (a) generating an optical carrier for transmission of application data and management data, said management data for routing said carrier through an optical communication network;
   (b) modulating said carrier to form a modulated carrier including
      (i) first modulating said carrier with a first modulation signal representative of application data, said first modulation presenting a stream of application data bits at a first frequency rate and having a first modulation amplitude;
      (ii) second modulating said carrier with a second modulation signal superimposed on said first modulation signal, said second modulation for transmission of management data, and said second modulation at a second frequency less than said first frequency and at a second amplitude less than said first amplitude, and continuously repeating transmission of said management data during transmission of said application data; and
   (c) inserting an additional data bit of a first type in a continuous stream of data bits of a second type if said continuous stream exceeds a specified number of data bits, the additional data bit types being selected from the group representing a digital "1" and a digital "0".

2. A method as recited in claim 1 further comprising
   (a) transmitting said modulated carrier over a fiber optic network to a receiver;
   (b) detecting said modulated carrier at a receiver resulting in reception of a composite data signal containing said application data and said management data; and
   (c) separating said application data and said management data.

3. A method as recited in claim 2 wherein said separating includes
   (a) passing said composite data signal through a limiting amplifier to remove said management data and to output said application data; and (b) passing said composite signal through a low pass filter circuit for removal of said application data and to output said management data.

4. A method as recited in claim 1 wherein said management data includes information for routing of said modulated carrier through said network.

5. A method as recited in claim 1 further comprising
   (a) transmitting said modulated carrier through an optic fiber to a first node;
   (b) sampling a portion of said carrier at said node;
   (c) demodulating said modulated carrier to extract said management data; and
   (d) evaluating said management data to determine if said modulated carrier is to be received by said first node, and if so, receiving said carrier.

6. A method as recited in claim 5 further comprising passing said modulated carrier on through said network if said carrier is not for reception at said first node.

7. An optical communication node apparatus including a node processing apparatus comprising:
   (a) an optical carrier source optical carrier for transmission through a fiber optic cable in a communications network;
   (b) a modulator for modulating said carrier, including
      (i) first circuitry for modulating said carrier with a first modulation signal representative of application data, said first modulation presenting a stream of application data bits at a first frequency rate and having a first modulation amplitude; and
      (ii) second circuitry for modulating said carrier with a second modulation signal superimposed on said first modulation signal, wherein said second modulation is amplitude modulation, and said second modulation signal is representative of channel management data, said second modulation signal presenting management data bits at a second frequency less than said first frequency and at a second amplitude less than said first amplitude, and for continuously repeating transmission of said management data during transmission of said application data;
   (c) a receiver including
      (i) detection apparatus for collecting a portion of an incoming optical carrier and for detecting said portion of said optical carrier and outputting a detected composite signal containing said application data upon which is superimposed said management data; and
      (ii) apparatus for separating said application data from said management data, wherein said apparatus for separating includes a limiting amplifier circuitry for removing said management data from said composite signal and outputting said application data, and a low pass filter circuitry for removing said application data from said composite signal and outputting said management data.

8. An apparatus as recited in claim 7 wherein said processing apparatus further includes
   (a) a switch; and
   (b) first apparatus responsive to said management data for determining if said incoming optical carrier is for reception by a current node, and if so for activating said switch to direct said incoming carrier for reception.

9. An apparatus as recited in claim 8 wherein said first apparatus is further for activating said switch for directing said incoming carrier to continue propagation through said network.

10. An apparatus as recited in claim 7 wherein said processing apparatus further includes
    (a) a switch; and
    (b) node processing apparatus for collecting a portion of an incoming optical carrier and for detecting said management data and for determining from said management data if said incoming carrier is for a current node, and
       (i) if said incoming carrier is for said current node, said processing apparatus causes said switch to direct said incoming carrier to said current node for reception; and
       (ii) if said incoming carrier is not for said current node, said processing apparatus causes said switch to direct said incoming carrier to continue propagation through said network.

11. An apparatus as recited in claim 7 wherein said processing apparatus further includes
    (a) a switch, and
    (b) a controller for activating said switch to connect said carrier for transmission to said network.

12. An apparatus as recited in claim 11 further comprising
    (a) a first plurality of said processor apparatus, each said processor apparatus having a processor optical input and a processor optical output;
    (b) a demultiplexer for receiving a first plurality of optical carriers, each having a wavelength, and for outputting each said carrier on a separate optical line for input to a particular one of said processor inputs; and
    (c) a multiplexer having a first plurality of optical multiplexer inputs, each said input for connection with a particular one of said processor optical outputs, and for outputting all optical carriers input to said multiplexer on a single multiplexer optical output for transmission of said carrier on a single optical network communication line.

* * * * *